United States Patent Office 3,812,071
Patented May 21, 1974

3,812,071
METHOD OF MANUFACTURING HYDROGELS
Artur Stoy, Prague, Czechoslovakia, assignor to Ceskoslovenska Akademie ved, Prague, Czechoslovakia
No Drawing. Filed Sept. 2, 1971, Ser. No. 177,495
Claims priority, application Czechoslovakia,
Sept. 8, 1970, 6,148/70
Int. Cl. C08f 1/86, 45/24
U.S. Cl. 260—29.6 TA                    6 Claims

ABSTRACT OF THE DISCLOSURE

Strong, elastic hydrogels are made by copolymerizing acrylonitrile or methacrylonitrile or mixtures thereof with co-monomers having hydrophilic side-groups, such as acrylamide, methacrylamide, acrylic acid, methacrylic acid and vinyl pyrrolidone or with mixtures of such co-monomers. The copolymerization is carried out in presence of free radicals and in an inorganic solvent which does not undergo any substantial chain transfer such as concentrated aqueous zinc chloride solution or nitric acid.

BACKGROUND OF THE INVENTION

According to my now abandoned U.S. patent application Ser. No. 43,926, filed June 6, 1970 and re-filed as 319,309 (Dec. 29, 1972) it is possible to prepare very strong hydrogels by free-radical polymerization of acrylonitrile or methacrylonitrile or mixtures thereof in acidic solvents which do not undergo chain transfer, followed by partial hydrolysis of the polymer so formed by dissolution or swelling thereof in the acidic solvents. In accordance with these teachings up to about 15 percent by weight of concentration of monomer can be used to provide the polymers which are soluble even in absence of chain transfer agents. At higher monomer concentrations, however, insoluble, more or less cross-linked hydrogels are obtained. The cross-linking is due mainly to chain transfer onto the monomer. Accordingly, the partial hydrolysis step causes some difficulty due to the cross-linking, especially when the monomer concentration is increased and it can be controlled only by the addition of chain transfer agents which reduce the chain length and are, therefore, not always advantageous.

OBJECT OF THE INVENTION

It is, therefore, a primary object of this invention to overcome such disadvantages by omitting the partial hydrolysis step. Other objects and advantages of the invention will be apparent from the following description thereof.

SUMMARY OF THE INVENTION

It has been found now that the partial hydrolysis, which causes such difficulties, particularly in case of large or thick articles, may be omitted, when acrylonitrile or methacrylonitrile are polymerized, that is, copolymerized with hydrophilic co-monomers in inorganic solvents which do not undergo substantially any chain transfer.

DESCRIPTION OF PREFERRED EMBODIMENTS

Among suitable hydrophilic monomers are acrylamide, methacrylamide, acrylic acid, methacrylic acid and the like. Exemplary of suitable inorganic solvents which undergo substantially no chain transfer there may be used preferably concentrated aqueous solutions of salts of the Hoffmeister series, such as zinc chloride, calcium rhodanide or lithium bromide, as well as concentrated nitric acid.

The cross-linking, as well as the hydrophilicity may be controlled more accurately and within very broad limits, depending on the kind of the co-monomer used. If, for instance, a higher degree of branching or cross-linking is desired, at relatively low monomer concentrations, then acrylamide or acrylic acid are suitable as co-monomers. On the other hand, methacryl amide or methacrylic acid are capable of reducing the degree of cross-linking considerably, depending on their concentration. Thus, in such a case the monomer concentration can be considerably increased without obtaining too tightly cross-linked hydrogels. This is very important since, as mentioned above, the only other means for decreasing the degree of cross-linking, that is, the addition of chain transfer agents, reduces the chain length which is not always advantageous.

The omission of the partial hydrolysis step is also advantageous since the whole process of preparing the hydrogel is thereby considerably accelerated. The solvent may be removed just after the polymerization is finished and the swelling capacity is quite uniform on the surface, as well as in the interior of the casting, even in the case of large blocks. It is also further advantageous in that long cross-links, consisting entirely of carbon-to-carbon bonds and thus very resistant against hydrolytic or other agents, results. A usually employed cross-linking agent or compound may be also added in small amounts if desired, but the cross-links formed thereby are short and less resistant to chemical attack.

The copolymerization is advantageously carried out in the presence of free radical initiators and under external cooling so that the temperature of the polymerizing solution does not exceed 30° C. When using free radical redox initiators, the copolymerization can be carried out at external temperatures as low as between 0° and —50° C.

Hydrogels according to the invention may be used as a wide variety of end products, such as sorbents, dialysis materials, in surgical prostheses for replacing tissues and organs, carriers of biologically active substance such as drugs or pesticides, and hydrophilic coatings and the like. Soluble hydrogels according to the invention which contain amidic side-groups can be cross-linked with compounds having a functionality greater than one such as formaldehyde, dimethylol urea, hexamethylene tetramine, epoxides or poly-isocyanates and those containing carboxylic side-groups may be cross-linked by cations of polyvalent metals, such as chromium, aluminium and ferric cations. The same cross-linking agents may be used also to make sparingly cross-linked, highly swellable hydrogels which are less hydrophilic and stronger.

Cross-linked hydrogels of the invention possess excellent mechanical and physico-chemical properties such as tensile strength, elasticity and permeability for low-molecular solutes. Their chemical stability in neutral and weakly acidic media is good. They are optically isotropic, since they do not contain frequent long sequences of units of the same kind and have thus, little tendency to form crystalline regions.

In order to avoid bubbles and discoloration, it is preferable to remove the polymerization heat by external cooling, preferably maintaining the outer temperature below zero centigrade. Another means for suppressing small bubbles is to carry out the polymerization under increased pressure, by using the pressure of an inert gas in a closed mold. Increased pressure can be also obtained using a weight on a piston to compress the polymerizing mixture in the mold.

Th hydrogels of the invention are very suitable e.g. for manufacturing soft contact lenses. As mentioned before, since they are well compatible with living tissues and mucuous membranes, causing no irritation or inflammatory reactions, they may be advantageously used for making prostheses for tubular or other organs. Coatings made from soluble hydrogels may be subsequently cross-linked in the manner mentioned above, using formaldehyde or aluminium sulfate. It is also possible to blend solutions of the hydrogels of the invention with active or inactive fillers and to precipitate the mixture, with or without subsequent cross-linking. In this way, various sorbents and catalysts, active in aqueous media, may be prepared. Such blends can be, however, used in other liquids, also in which the cross-linked hydrogels swell. Such liquids include dimethyl formamide, dimethyl sulfoxide or formamide.

Various embodiments of the invention are illustrated by following examples. In the examples all parts and percents are by weight unless otherwise indicated.

EXAMPLE 1

11 grams of acrylonitrile, 14.5 grams of acrylamide and 7.5 grams of acrylic acid were dissolved in 72 grams of concentrated aqueous zinc chloride solution ($d=2.00$). 1.5 ml. of a 5 percent aqueous solution of ammonium persulfate was added, the solution was quickly degasified using a water jet pump and cooled to $-8°$ C. Thereafter 1 ml. of a 5 percent potassium metabisulfite ($K_2S_2O_5$) aqueous solution was added, the solution thoroughly stirred and poured into a 55 cm. long glass tube, 12 mm. in diameter, and which was sealed at one end and which was previously cooled to $-40°$ C. in a Dry Ice-ethanol mixture. As cooling bath, a 10 cm. wide thermo-insulated glass tube was used. The temperature of the mixture was kept at $-30°$ C. for two hours, the top end of the 12 mm. tube being tightly fitted to a carbon dioxide pressure bottle and the pressure above the surface of the polymerizing solution being kept at 3 atmospheres. The solution was kept under pressure until to the next day the temperature are permitted to increase slowly to the ambient temperature. The pressure was then reduced to to atmospheric, the tube opened and the gel-like, very elastic transparent, bubble-free polymer was removed from the tube by means of a wire hook and a pincette. The gel was then washed in water, the last traces of zinc ions being removed in a 0.2 percent aqueous sodium bicarbonate solution. After having been stepwise washed in water, in 0.2% citric acid, again in water, in an 0.2 percent sodium bicarbonate and in water again, the gel was slowly dried with a 200 gram weight being fastened to its lower end. The approximately 10 mm. thick rod of glasslike hard polymer was then cut into small cylinders from which contact lenses were made by the usual mechanical working steps. The lenses were swelled in sterile 0.8 percent aqueous sodium chloride solution. They were elastic and well permeable to gases and ions.

EXAMPLE 2

20 grams of acrylonitrile, 10 grams of acrylamide and 10 grams of methacrylamide were dissolved in 60 grams of a concentrated aqueous zinc chloride solution ($d=2.0$). After quick degasification as in Example 1, the solution was cooled to $-10°$ C. and initiated by admixing 1 ml. of a 10% aqueous potassium persulfate solution and 0.5 ml. of a 10% aqueous potassium metabisulfite solution. The solution was then poured into a pre-cooled mold consisting of two glass plates held apart by a 1.5 ml. thick silicone rubber gasket, the whole being clamped together by screw clamps. The filled mold was then put into a refrigerator and kept there for 6 hours at $-20°$ C. The mold was removed from the refrigerator and left standing overnight at room temperature. The mold was then dismounted and the elastic transparent foil obtained was washed in ice-cold water. After having washed out most of the zinc chloride, the rest of it was removed in a bath of 0.5% aqueous sodium bicarbonate solution. The foil was suitable for dialysis material.

EXAMPLE 3

20 grams of methacrylonitrile, 20 grams of acrylamide and 10 grams of acrylic acid were dissolved in 50 g. of a 71 percent nitric acid solution, to which 0.2% of urea was previously added. The solution was quickly degasified as in the prior examples and initiated by adding 0.5% of dimethylamino ethylacetate and 0.1% of ammonium persulfate. The solution was kept in a glass beaker at $15°$ C. for two days, air being excluded by a 10 mm. thick surface layer of white paraffin oil. The elastic obtained was then washed out in water until it showed a neutral reaction. The hydrogel thus obtained was useful as material for filtration and/or sorption of heavy metal cations. It can also be ionically cross-linked by $Cr^{3+}$, $Al^{+3}$, $Fe^{+3}$ and other polyvalent cations.

EXAMPLE 4

24 grams of acrylonitrile, 2 grams of dimethylaminoethanol and 11 grams of methacrylic acid were mixed together and then dissolved in 65 grams of decolorized 65% nitric acid ($d=1.500$). Then 2 ml. of a 5% aqueous potassium persulfate solution were added, the solution was quickly degasified using a water jet vacuum pump and poured into a long thick-walled test tube, the upper portion of which was then filled with paraffin oil. A perforated rubber stopper was then applied to the filled tube so that the oil overflowed leaving no air bubble therein. The test tube was fastened in vertical position, a syringe without needle, full of paraffin oil, was fitted into the rubber stopper and a 2 kg. weight was laid onto the piston so that the whole content of the test tube was kept under pressure. The polymerization was carried out at $15°$ C. for 72 hours. The elastic gel so obtained was then removed from the test tube and nitric acid washed out. The hydrogel thus obtained could be used for surgical purposes or as a sorbent for silver or cuprous ions, respectively.

EXAMPLE 5

The monomer mixture according to Example 4 was polymerized under a blanket of carbon dioxide at atmospheric pressure at $20°$ C., and after 30 hours, when the viscosity had increased markedly, 0.8 gram of soluble corn starch was stirred in. The temperature of the mixture, placed in a beaker immersed in a water bath, was then gradaully increased till the mixture turned yellow and was foamed by liberated nitrogen gases. The foamed gel was cut, while held under streaming water, into small pieces, treated 6 hours with a 2% aluminium nitrate (monohydrate) solution while stirring, washed thoroughly and used to fill a sorption column for treating waste waters containing low concentrations of palladium chloride.

The processes described in the above examples may be modified in various manners, not only in so far as the composition of monomer mixtures is concerned, but also in the quality and quantity of the solvents and the polymerization catalysts or initiators. It is possible to use aqueous solutions of magnesium perchlorate $Mg(ClO_4)_2$ as solvent. Nitric acid may be more or less diluted with water on part of the zinc chloride or other solvent salt of the Hoffmeister series can be replaced by another salt which itself does not dissolve acrylonitrile polymers, such as, for example, sodium or calcium chloride and the like. The inorganic redox initiators used in most of the above examples may be replaced by organic initiators, such as dibenzoyl peroxide, cumene hydroperoxide, acrylonitrile hydroperoxide, di-isopropyl percarbonate and the like, either alone or together with a reductive component, such as a thiosulfate, a metabisulfite (pyrosulfite), dimethylamino alcohol, dimethylaminoethyl acetate, sodium p-toluene sulfonate, copper-pyridinium complex and many others. Redox systems, both inorganic and organic, are usually active only in the presence of ions of heavy metals such as copper, iron, titanium, manganese or silver. Traces of activators of this kind are, however, usually present in the solvents employed so that it is only necessary to add them in exceptional cases. Instead of using free-radical polymerization catalysts of the above mentioned kind, it is also possible to liberate free radicals by irradiating monomer mixtures in presence of photo-initiators, such as benzoin, when using ultraviolet rays, or in presence of aromatic-aliphatic azo-compounds when using visible light.

Numerous other variations and advantages of this invention will be apparent to those skilled in the art. Accordingly, it is to be understood that this invention is not to be limited except as defined in the appended claims.

What is claimed is:

1. Method of manufacturing shape-retaining cross-linked hydrogels comprising polymerizing higher than 15% by weight total monomers of acrylonitrile or methacrylonitrile with at least one co-monomer having hydrophilic side groups and selected from the group consisting of acrylamide, methacrylamide, acrylic acid and methacrylic acid and mixtures of said co-monomers, in the presence of a concentrated inorganic acidic solvent which does not undergo substantially any chain transfer operative to form said hydrogel.

2. Method as set forth in claim 1, wherein at least part of the co-monomer units is formed by subsequent hydrolysis of acrylonitrile or methacrylonitrile units in the acidic solvent.

3. Method as set forth in claim 2, wherein the hydrolysis is accelerated by gaseous hydrogen halide.

4. Method as set forth in claim 2, wherein the acidic solvent is nitric acid.

5. Method as set forth in claim 1, wherein the copolymerization is carried out in absence of chain transfer agents.

6. Method as set forth in claim 1, wherein the copolymerization is carried out under external cooling to less than 30° C.

References Cited

UNITED STATES PATENTS

| | | | |
|---|---|---|---|
| 2,356,767 | 8/1944 | Kropa | 260—29.6 AB |
| 2,648,647 | 8/1953 | Stanton et al. | 260—29.6 AB |
| 2,763,636 | 9/1956 | Davis | 260—88.7 B |
| 2,968,558 | 1/1961 | Clavier et al. | 260—29.6 AB |
| 3,242,120 | 3/1966 | Steuber | 260—29.6 AB |
| 3,274,140 | 9/1966 | Brealey | 260—29.6 AB |
| 3,397,262 | 8/1968 | Stoy et al. | 260—29.6 AB |

FOREIGN PATENTS

| | | | |
|---|---|---|---|
| 226,823 | 2/1960 | Australia | 260—29.6 AB |

LUCILLE M. PHYNES, Primary Examiner

U.S. Cl. X.R.

260—29.6 AB, 88.7 B, 85.5 AM, S